United States Patent
Miyazato et al.

(10) Patent No.: US 10,380,743 B2
(45) Date of Patent: Aug. 13, 2019

(54) OBJECT IDENTIFYING APPARATUS

(71) Applicant: TOYOTA JIDOSHA KABUSHIKI KAISHA, Toyota-shi, Aichi-ken (JP)

(72) Inventors: Kazuhiro Miyazato, Susono (JP); Masamichi Ohsugi, Nagaizumi-cho (JP); Hideaki Sawada, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 31 days.

(21) Appl. No.: 15/595,381

(22) Filed: May 15, 2017

(65) Prior Publication Data
US 2017/0358089 A1    Dec. 14, 2017

(30) Foreign Application Priority Data
Jun. 14, 2016    (JP) .................. 2016-118233

(51) Int. Cl.
*G06T 7/73* (2017.01)
*G06T 7/60* (2017.01)
(Continued)

(52) U.S. Cl.
CPC ............ *G06T 7/13* (2017.01); *G06K 9/00771* (2013.01); *G06T 7/11* (2017.01); *G06T 7/12* (2017.01);
(Continued)

(58) Field of Classification Search
None
See application file for complete search history.

(56) References Cited

U.S. PATENT DOCUMENTS

| | | | |
|---|---|---|---|
| 7,245,315 B2* | 7/2007 | Sadok | G08B 17/125 348/143 |
| 2010/0002071 A1* | 1/2010 | Ahiska | H04N 5/217 348/36 |

(Continued)

FOREIGN PATENT DOCUMENTS

| | | |
|---|---|---|
| JP | 2012-118698 A | 6/2012 |
| JP | 2013-203337 A | 10/2013 |

(Continued)

OTHER PUBLICATIONS

Ho, "Machine vision-based real-time early flame and smoke detection," Meas. Sci. Technol. 20 (Year: 2009).*

(Continued)

*Primary Examiner* — Soo Shin
(74) *Attorney, Agent, or Firm* — Sughrue Mion, PLLC

(57) ABSTRACT

An object identifying apparatus (13) has: a first determining device (131) configured to determine a first region (231) including an object in an image; a second determining device (134) configured to determining a specific border portion (302) in the first region from a border (301) of the object at which a degree of gradient of image characteristics amount is equal to or larger than a predetermined amount, the specific border portion is a portion at which a direction of the gradient of the image characteristics amount is one direction and a distribution range of the specific border portion in the first region is larger than that of another border portion at which the direction of the gradient of the image characteristics amount is another direction different from the one direction; and an identifying device (136) configured to identify the object on the basis of a first parameter (A) representing a length of the first region and a second parameter (B) representing a length of the specific border portion.

19 Claims, 9 Drawing Sheets

(51) Int. Cl.
*G06T 7/521* (2017.01)
*G06T 7/194* (2017.01)
*G06T 7/13* (2017.01)
*G06T 7/12* (2017.01)
*G06T 7/11* (2017.01)
*G06K 9/00* (2006.01)

(52) U.S. Cl.
CPC ............. *G06T 7/194* (2017.01); *G06T 7/521* (2017.01); *G06T 7/60* (2013.01); *G06T 7/73* (2017.01); *G06T 2207/10024* (2013.01); *G06T 2207/10028* (2013.01); *G06T 2207/30196* (2013.01)

(56) References Cited

U.S. PATENT DOCUMENTS

| | | | |
|---|---|---|---|
| 2012/0133739 A1* | 5/2012 | Morimitsu | G01B 11/24 348/46 |
| 2013/0011016 A1* | 1/2013 | Haas | G06K 9/00818 382/103 |
| 2013/0259309 A1 | 10/2013 | Sekiguchi | |
| 2014/0099020 A1* | 4/2014 | Ko | G06K 9/6262 382/159 |

FOREIGN PATENT DOCUMENTS

| | | |
|---|---|---|
| JP | 2013-206328 A | 10/2013 |
| JP | 2014-10771 A | 1/2014 |
| JP | 2014-215718 A | 11/2014 |
| JP | 2015-75826 A | 4/2015 |
| JP | 2016-1435 A | 1/2016 |

OTHER PUBLICATIONS

Sentenac et al., "Overheating, flame, smoke, and freight movement detection algorithms based on charge-coupled device camera for aircraft cargo hold surveillance," Opt. Eng. 43(12) 2935-2953 (Year: 2004).*

Yuan et al., "Video Smoke Detection Based on Semitransparent Properties," The 27th Chinese Control and Decision Conference (2015 CCDC) (Year: 2015).*

Z. Xiong, et al., "Video-based smoke detection: possibilities, techniques, and challenges," in: IFPA, Fire Suppression and Detection Research and Applications—A Technical Working Conference (SUPDET), 2007. (Year: 2007).*

* cited by examiner

[FIG. 1]
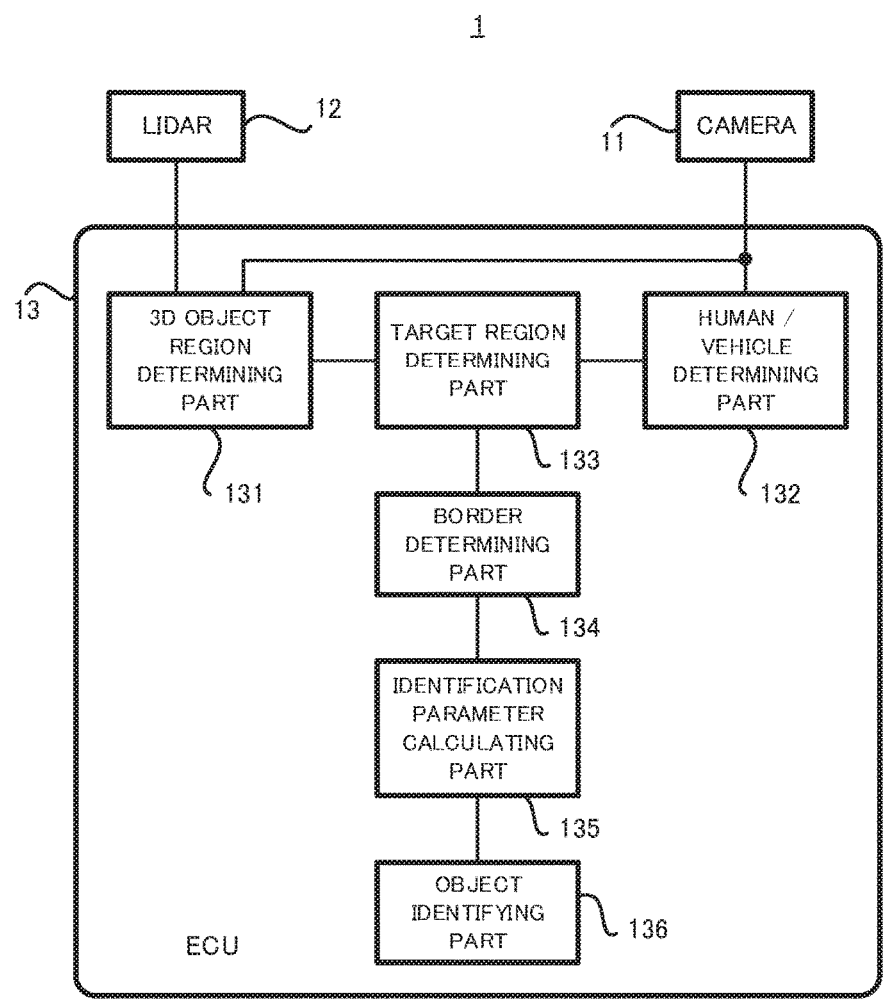

[FIG. 3]
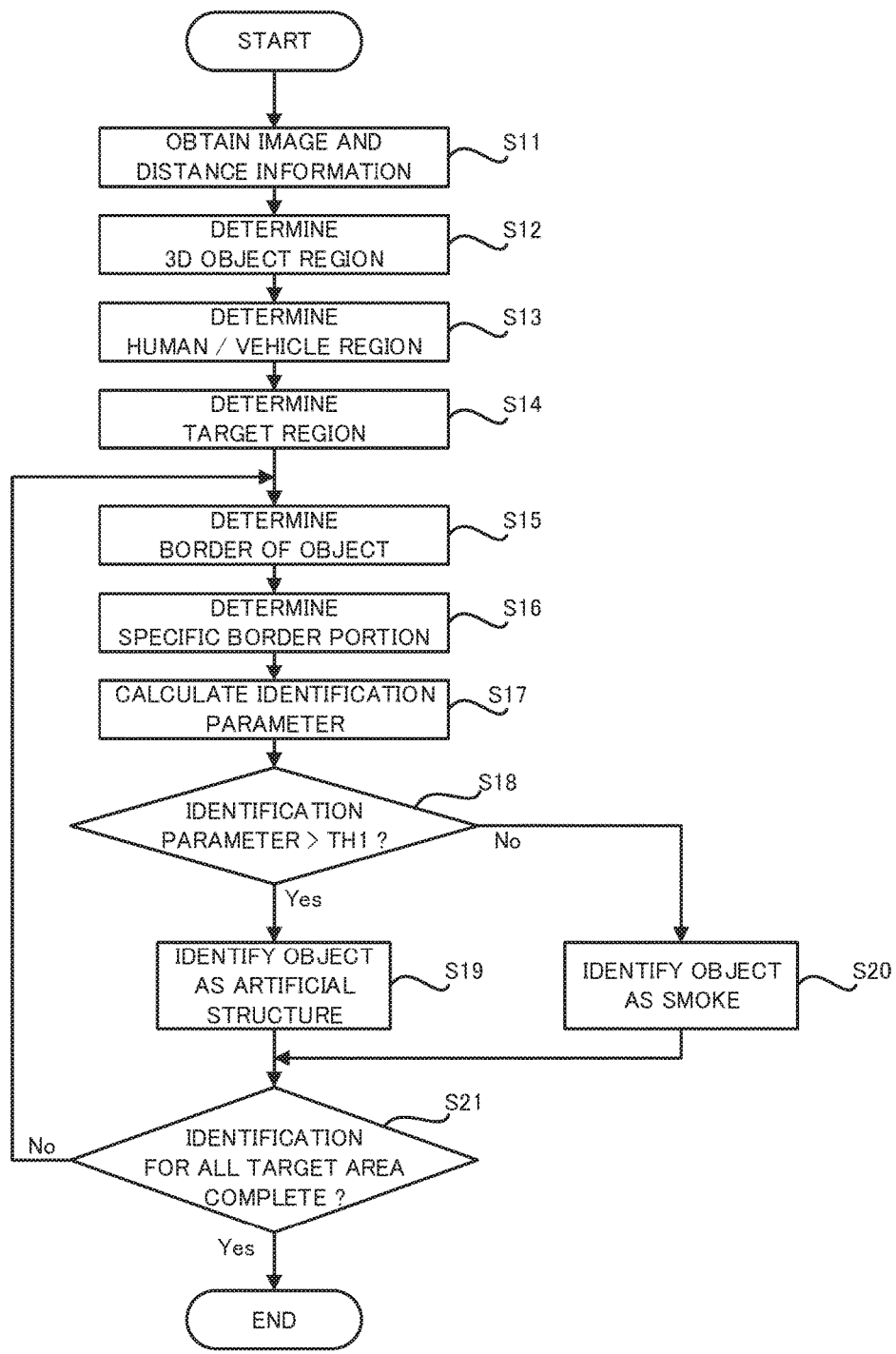

[FIG. 9]
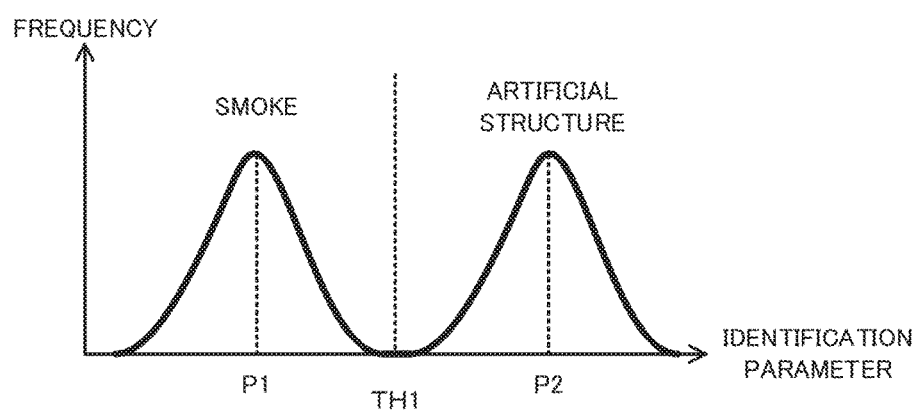

[FIG. 11]
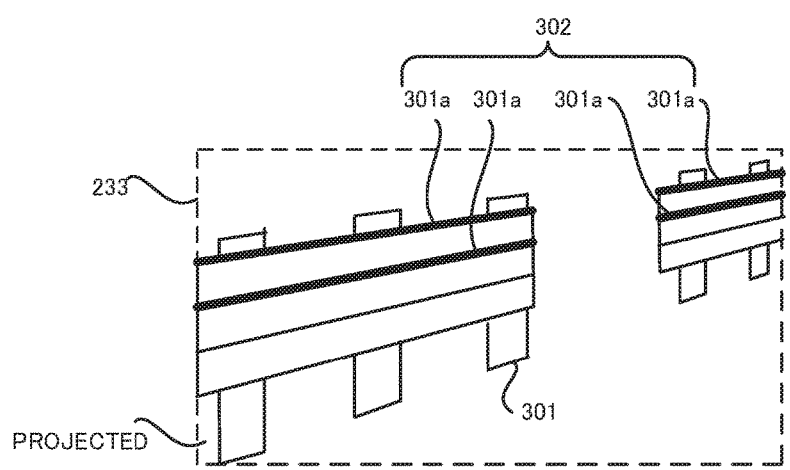
[FIG. 12]
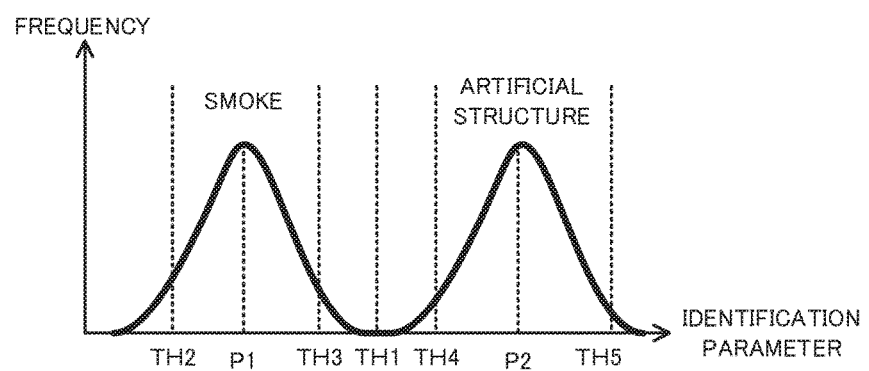

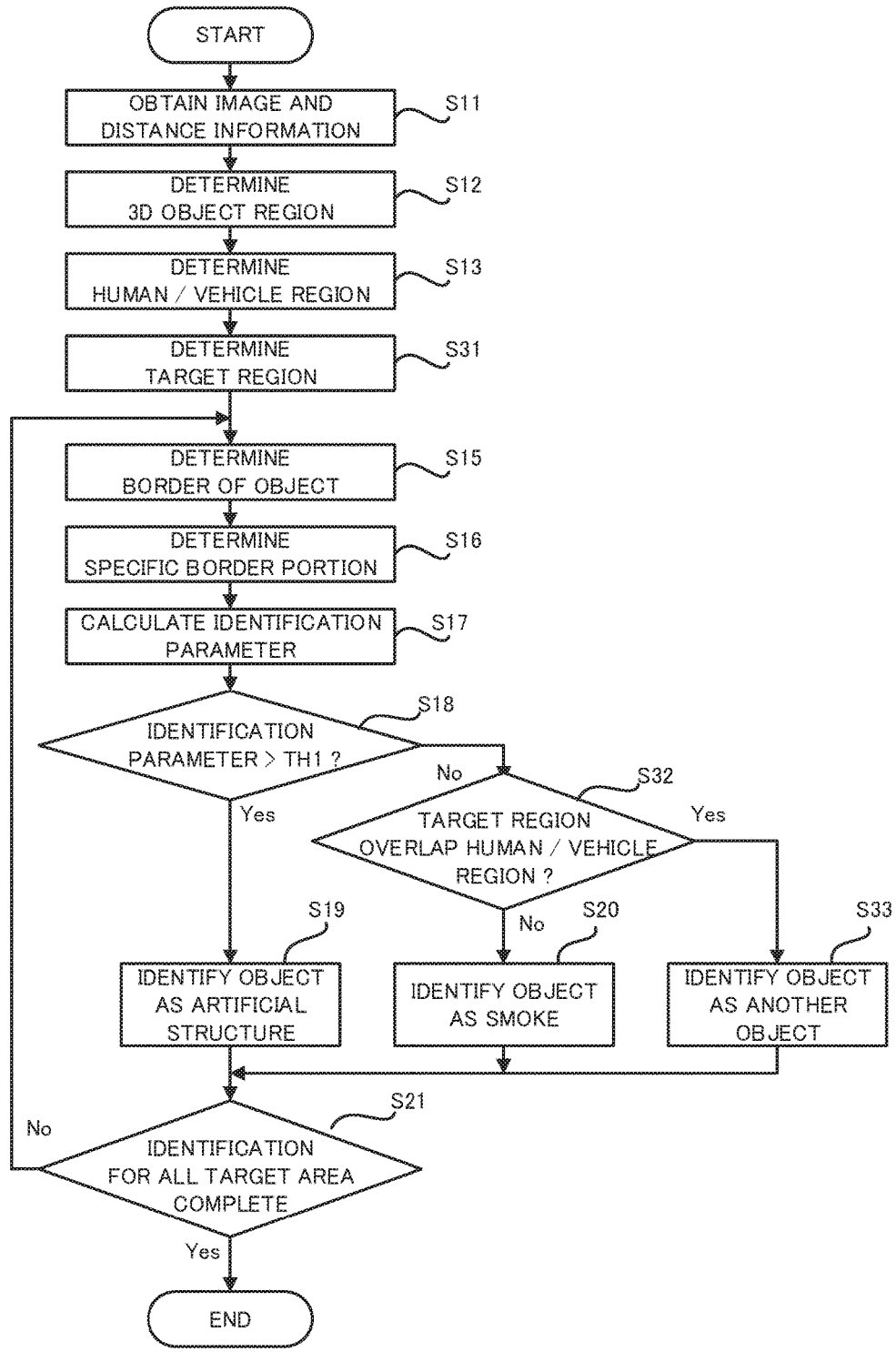

OBJECT IDENTIFYING APPARATUS

TECHNICAL FIELD

The present invention relates to a technical field of an object identifying apparatus configured to identify an object in an image.

BACKGROUND ART

An object identifying apparatus that is configured to identify an object in an image captured by a camera is known. A Patent Literature 1 discloses, as one example of the object identifying apparatus, an object identifying apparatus that is configured to identify whether or not the object in the image is a smoke-like object. The object identifying apparatus disclosed in the Patent Literature 1 calculates disparity (parallax) from a pair of images captured by a stereo camera, and specifies a target region in the image in which the object being an identification target appears on the basis of the calculated disparity. Then, the object identifying apparatus disclosed in the Patent Literature 1 identifies whether or not the object in the target region is the smoke-like object on the basis of edge strength in the target region. Specifically, the object identifying apparatus generates a histogram of the edge strength, specifies the edge strength EN at which cumulative value obtained by adding the histogram from an upper side is equal to or more than N % of the total, and identifies that the object in the target region is the smoke-like object if the edge strength EN is equal to or smaller than a threshold value S.

Each of a Patent Literature 2 to a Patent Literature 7 discloses another example of the object identifying apparatus. However, the object identifying apparatus disclosed in each of the Patent Literature 2 to the Patent Literature 7 has less relation to the present invention compared to the object identifying apparatus disclosed in the Patent Literature 1, and thus the detailed description of them will be omitted.

CITATION LIST

Patent Literature

[Patent Literature 1] Japanese Unexamined Patent Application Publication No. 2012-118698
[Patent Literature 2] Japanese Unexamined Patent Application Publication No. 2015-075826
[Patent Literature 3] Japanese Unexamined Patent Application Publication No. 2014-215718
[Patent Literature 4] Japanese Unexamined Patent Application Publication No. 2014-010771
[Patent Literature 5] Japanese Unexamined Patent Application Publication No. 2013-206328
[Patent Literature 6] Japanese Unexamined Patent Application Publication No. 2013-203337
[Patent Literature 7] Japanese Unexamined Patent Application Publication No. 2016-001435

SUMMARY OF INVENTION

Technical Problem

The object identifying apparatus disclosed in the Patent Literature 1 is configured to identify whether or not the object is the smoke-like object on the basis of a level of the edge strength. The reason why the object identifying apparatus is capable of identifying the object in this manner is that the edge strength of the smoke-like object is more likely to be smaller than the edge strength of another object (for example, an artificial structure such as a guard rail, a pole and a power pole) different from the smoke-like object.

However, the edge strength of the smoke-like object becomes larger in the case where a color (alternatively, another characteristics such as luminance, same applies in this paragraph and next paragraph) of the smoke-like object is vastly different from a color of background behind the smoke-like object, compared to the case where the color of the smoke-like object is not vastly different from the color of the background behind the smoke-like object. Thus, it may be determined that the above described edge strength EN is not equal to or less than the threshold value S even when the object in the target region is the smoke-like object. As a result, the object in the image may be wrongly identified as not the smoke-like object (for example, as the artificial structure) in the case where the object in the image should be identified as the smoke-like object.

In a same manner, the edge strength of another object different from the smoke-like object in the image becomes smaller in the case where the color of another object in the image is not vastly different from the color of background behind another object, compared to the case where the color of another object in the image is vastly different from the color of the background behind another object. Thus, it may be determined that the above described edge strength EN is equal to or less than the threshold value S even when the object in the target region is not the smoke-like object. As a result, the object in the image may be wrongly identified as not another object (for example, as the smoke-like object) in the case where the object in the image should be identified as another object different from the smoke-like object (for example, as the artificial structure).

As described above, the object identifying apparatus configured to identify the object in the image simply on the basis of the level of the edge strength has such a technical problem that an accuracy of the identification is not necessarily good.

The above described technical problem is one example of the technical problem to be solved by the present invention. It is therefore an object of the present invention to provide, for example, an object identifying apparatus that is capable of identifying an object in an image more accurately.

Solution to Problem

<1>
One aspect of an object identifying apparatus has: a first determining device that is configured to determine a first region in an image, an object that is an identification target being in the first region; a second determining device that is configured to determine a specific border portion in the first region, the specific border portion being at least one portion of a border of the object at which a degree of gradient of image characteristics amount is equal to or larger than a predetermined amount, the specific border portion being a portion at which a direction of the gradient of the image characteristics amount is one direction, and a distribution range of the specific border portion in the first region is larger than that of another border portion at which the direction of the gradient of the image characteristics amount is another direction different from the one direction; and an identifying device that is configured to identify the object on the basis of a first parameter representing a length of the first region and a second parameter representing a length of the specific border portion.

As described later in detail with reference to the drawings, at least one of the first parameter and the second parameter varies depending on a type of the object mainly, regardless of a relationship between a color (alternatively, another characteristics such as luminance, same is true in this paragraph) of the object and a color of background behind the object. Therefore, the object identifying apparatus is capable of identifying the object more accurately than an object identifying apparatus in a comparison example that is configured to identify the object simply on the basis of the degree of the gradient of the image characteristics amount.

<2>

In another aspect of the above described object identifying apparatus, the identifying device is configured to identify the object on the basis of a relative relationship between the first parameter and the second parameter.

As described later in detail with reference to the drawings, the relative relationship between the first parameter and the second parameter varies depending on the type of the object mainly, regardless of the relationship between the color (alternatively, another characteristics such as luminance, same is true in this paragraph) of the object and the color of background behind the object. Therefore, the identifying device is capable of identifying the object more accurately on the basis of the relative relationship between the first parameter and the second parameter.

<3>

In another aspect of the above described object identifying apparatus configured to identify the object on the basis of the relative relationship between the first parameter and the second parameter, the identifying device is configured to identify that the object is smoke, if the relative relationship is a first relationship that is set in advance as the relative relationship observed when the object is the smoke, the identifying device is configured to identify that the object is an artificial structure, if the relative relationship is a second relationship that is different from the first relationship and that is set in advance as the relative relationship observed when the object is the artificial structure.

The relative relationship between the first parameter and the second parameter when the object is the smoke can be discriminated from the relative relationship between the first parameter and the second parameter when the object is the artificial structure. Therefore, according to this aspect, the identifying device is capable of identifying more accurately whether or not the object is the smoke and whether or not the object is the artificial object on the basis of the relative relationship between the first parameter and the second parameter.

<4>

In another aspect of the above described object identifying apparatus configured to identify the object on the basis of the relative relationship between the first parameter and the second parameter, the relative relationship includes at least one of a ratio of the second parameter to the first parameter and a difference between the first parameter and the second parameter.

According to this aspect, the identifying device is capable of identifying the object more accurately on the basis of at least one of the ratio of the second parameter to the first parameter and the difference between the first parameter and the second parameter.

<5>

In another aspect of the above described object identifying apparatus configured to identify the object on the basis of at least one of the ratio and the difference, the identifying device is configured to identify that the object is smoke, if the ratio is smaller than a first threshold value or the difference is larger than a second threshold value, the identifying device is configured to identify that the object is an artificial structure, if the ratio is larger than a third threshold value that is equal to or larger than the first threshold value or the difference is smaller than a fourth threshold value that is equal to or smaller than the second threshold value.

As described later in detail with reference to the drawings, there is a high possibility that the ratio of the second parameter to the first parameter when the object is the smoke is smaller than the ratio of the second parameter to the first parameter when the object is the artificial structure. Moreover, there is a high possibility that the difference between the first parameter and the second parameter when the object is the smoke is larger than the difference between the first parameter and the second parameter when the object is the artificial structure. Therefore, according to this aspect, the identifying device is capable of identifying more accurately whether or not the object is the smoke and whether or not the object is the artificial object on the basis of at least one of the ratio of the second parameter to the first parameter and the difference between the first parameter and the second parameter.

<6>

In another aspect of the above described object identifying apparatus, the first parameter represents, as the length of the first region, a length of a first line that is obtained by connecting two points on an outer rim of the first region, the second parameter represents, as the length of the specific border portion, a length of a second line that is obtained by projecting the specific border portion onto the first line According to this aspect, each of the first parameter and the second parameter is suitable for identifying the object more accurately.

<7>

In another aspect of the above described object identifying apparatus in which the first parameter represents the length of the first line, a shape of the first region is a rectangle shape, the first line is one side of the first region.

According to this aspect, each of the first parameter and the second parameter is suitable for identifying the object more accurately.

<8>

In another aspect of the above described object identifying apparatus in which the first line is the one side of the first region, the one side is a longer side of the first region.

As described later in detail with reference to the drawings, the object identifying apparatus is capable of identifying the object by using an identification criterion whether or not the border of the object includes a border portion linearly extending in at least one portion of the first region. Here, there is a high possibility that the object such as the artificial structure and the smoke has a shape extending in a certain direction (for example, in a vertical direction or in a horizontal direction) in a three-dimensional space. Thus, there is a high possibility that the border portion linearly extending in at least one portion of the first region extends along the longer side of the first region that corresponds to a direction along which the object extends in the three-dimensional space. Therefore, when the first parameter that represents the length of the longer side of the first region and the second parameter that represents the length of the second line that is obtained by projecting the specific border portion onto the longer side are used, the identification accuracy of the object identifying apparatus is expected to improve.

<9>

In another aspect of the above described object identifying apparatus, the first determining device is configured to determine the first region by analyzing the image with a first analysis method, the object identifying apparatus further has a third determining device that is configured to determine a second region in the image by analyzing the image with the first analysis method or a second analysis method different from the first analysis method, a predetermined object that is allowed to be eliminated from the identification target is in the second region, the second determining device is configured to determine the specific border portion in the first region that does not overlap with the second region and not to determine the specific border portion in the first region that overlaps with the second region.

According to this aspect, processing load of the object identifying apparatus can be reduced, because the second determining device does not have to determine specific border portion in the first region that overlaps with the second region. Moreover, the since the predetermined object is allowed to be eliminated from the identification target, a deterioration of the identification accuracy that is caused by wrongly identifying that the predetermined object is a different object can be suppressed.

<10>

In another aspect of the above described object identifying apparatus, the first determining device is configured to determine the first region by analyzing the image with a first analysis method, the object identifying apparatus further has a third determining device that is configured to determine a second region in the image by analyzing the image with the first analysis method or a second analysis method different from the first analysis method, a predetermined object that is allowed to be eliminated from the identification target is in the second region, the second determining device is configured to determine the specific border portion on the basis of the first parameter, the second parameter and a result of the determination by the third determining device.

According to this aspect, the identifying device is capable of identifying the object by considering the predetermined object that is allowed to be eliminated from the identification target. Thus, the reduction of the identification accuracy that is caused by wrongly identifying that the predetermined object is a different object (namely, the predetermined object is one object that can be the identification target) can be suppressed.

<11>

In another aspect of the above described object identifying apparatus, the border includes a plurality of second pixels at each of which the degree of the gradient of the image characteristics amount is equal to or larger than the predetermined amount, the plurality of second pixels are at least one portion of a plurality of first pixels included in the image, the specific border portion includes a plurality of third pixels, the plurality of third pixels are at least one portion of the plurality of second pixels, the direction of the gradient of the image characteristics amount at each of the plurality of third pixels is the one direction, the number of the third pixels is larger than the number of a plurality of fourth pixels at each of which the direction of the gradient of the image characteristics amount is the another direction.

According to this aspect, the border, the specific border portion and the second parameter are defined from a viewpoint of the pixel that is included in the image.

BRIEF DESCRIPTION OF DRAWINGS

FIG. 1 is a block diagram that illustrates one example of a structure of a vehicle of the present embodiment.

FIG. 3 is a flowchart that illustrates flow of an object identifying operation.

FIG. 9 is a graph that illustrates a relationship between an appearance frequency of a parameter for identification and a threshold value.

FIG. 11 is a planar view that illustrates an example in which a specific border portion includes a plurality of border portions each of which linearly extends in at least one portion of the target region.

FIG. 12 is a graph that illustrates a relationship between the appearance frequency of the parameter for identification and a plurality of threshold values.

FIG. 13 is a flowchart that illustrates flow of an object identifying operation in a modified example.

DESCRIPTION OF EMBODIMENTS

Figure 2A:
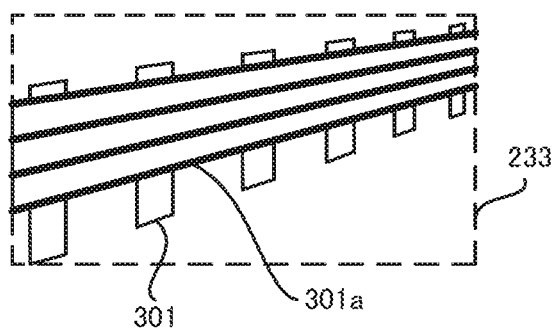
FIG. 2(a) is a planar view that illustrates one example of a border of a guard rail.

Hereinafter, one embodiment of an object identifying apparatus of the present invention will be explained. In the following explanation, a vehicle 1 to which one embodiment of the object identifying apparatus of the present invention is adapted will be explained. However, the embodiment of the object identifying apparatus of the present invention may be adapted to any apparatus that is different from the vehicle.

(1) Structure of Vehicle 1

Firstly, with reference to FIG. 1, the structure of the vehicle 1 of the present embodiment will be explained. As illustrated in FIG. 1, the vehicle 1 has: a camera 11, a LIDAR (Light Detection and Ranging) 12; and an ECU (Electrical Control Unit) 13 that is one specific example of the "object identifying apparatus".

The camera 11 is an imaging apparatus that is configured to image an outside situation anterior to the vehicle 1. The image captured by the camera 11 is outputted to the ECU 13.

The LIDAR 12 is configured to detect distance information representing a distance to an object that exists anterior to the vehicle 1 by emitting light ahead of the vehicle 1 and detecting the light reflected by the object. The distance information detected by the LIDAR 12 is outputted to the ECU 13.

The ECU 13 is configured to perform an object identifying operation for identifying what object the object in the image captured by the camera 11 is. In order to perform the object identifying operation, the ECU 13 includes, as processing blocks that are logically realized in the ECU 13, a 3D (three dimensional) object region determining part 131 that is one specific example of the "first determining device", a human/vehicle determining part 132 that is one specific example of the "third determining device", a target region determining part 133, a border determining part 134 that is one specific example of the "second determining device", an identification parameter calculating part 135 and an object identifying part 136 that is one specific example of the "identifying device". Although an operation of each processing block will be described later in detail (see FIG. 3 and so on), overview of the operation of each processing block will be briefly described in the following paragraphs.

The 3D object region determining part 131 is configured to determine (in other words, specify or set) a 3D object region 231 in the image on the basis of the image outputted from the camera 11 and the distance information outputted from the LIDAR 12. The 3D object region 231 is a region in which a 3D object is (in other words, appears or exists). The 3D object region determining part 131 is further configured to output a determination result thereof to the target region determining part 133. Note that the 3D object region 231 is one specific example of the "first region".

The human/vehicle determining part 132 is configured to determine a human/vehicle region 232 in the image on the basis of the image outputted from the camera 11. The human/vehicle region 232 is a region in which a human or a vehicle is (in other words, appears or exists). The human/vehicle determining part 132 is further configured to output a determination result thereof to the target region determining part 133. Note that the human/vehicle region 232 is one specific example of the "second region".

The target region determining part 133 is configured to determine a target region 233 that is a target for the object identifying operation on the basis of the 3D object region 231 and the human/vehicle region 232.

The border determining part 134 is configured to determine a border 301 of the object included in the target region 233 (hereinafter, the object in the target region 233 is referred to as a "target object"). The "border 301" in the present embodiment means at least one of a line (alternatively a linear region) that is allowed to divide the target object and another object different from the target object, a line (alternatively a linear region) that is allowed to divide the target object and background behind the target object and a line (alternatively a linear region) that is allowed to divide one portion of the target object and another portion of the target object. The border 301 corresponds to pixels at each of which gradient of image characteristics amount is equal to or larger than a predetermined amount (namely, pixels at each of which the difference of the image characteristics amount from adjacent pixel is equal to or larger than a certain amount). In other words, the border 301 corresponds to a region including these pixels (namely, a region at which these pixels exist).

The border determining part 134 is further configured to determine a specific border portion 302 that is at least one portion of the determined border 301. The specific border portion 302 corresponds to pixels at which directions of the gradients of the image characteristics amounts are same as one another (namely, a region including these pixels or a region at which these pixels exist).

The identification parameter calculating part 135 is configured to calculate an identification parameter P on the basis of a determination result of the target region determining part 133 and a determination result of the border determining part 134.

The object identifying part 136 is configured to identify what object the target object in the target region 233 is on the basis of the identification parameter P calculated by the identification parameter calculating part 135. Specifically, the object identifying part 136 is capable of identify whether or not the target object is smoke (more specifically, whether or not the target object is a candidate that may be the smoke, the same applies to the following explanation). The object identifying part 136 may be capable of identify whether or not the target object is an artificial structure (more specifically, whether or not the target object is a candidate that may be the artificial structure, the same applies to the following explanation), in addition to or instead of identifying whether or not the target object is the smoke. The artificial structure is typically an artificial structure located on a road, and may be a guard rail, a pole, a power pole and the like, for example. In the following description, an example in which the object identifying part 136 is capable of identifying whether the target object is the smoke or the artificial structure will be described, for the purpose of simple description.

(2) Object Identifying Operation

Next, the object identifying operation performed by the ECU 13 will be described.

(2-1) Overview of Object Identifying Operation

Firstly, with reference to FIG. 2(a) to FIG. 2(c), overview of the object identifying operation will be described.

FIG. 2(a) illustrates, by using solid lines, one example of the border 301 determined in the target region 233 in which the guard rail (namely, the artificial structure) that may be one example of the target object exists. As illustrated in FIG. 2(a), the border 301 of the guard rail includes border portions 301a (see thick solid lines) each of which linearly extends in whole of the target region 233 (alternatively, in one portion of the target region 233 in some cases, the same applies to the following description).

Figure 2B:
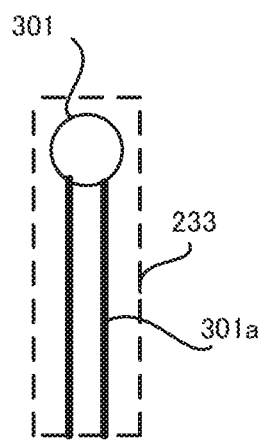
FIG. 2(b) is a planar view that illustrates one example of a border of a pole.

FIG. 2(b) illustrates, by using solid lines, one example of the border 301 determined in the target region 233 in which the pole (what we call a pole cone, and namely, the artificial structure) that may be one example of the target object exists. As illustrated in FIG. 2(b), the border 301 of the pole includes border portions 301a (see thick solid lines) each of which linearly extends in whole of the target region 233 (alternatively, in one portion of the target region 233 in some case). Note that the border 301 of the power pole that may be one example of the target object is expected to include border portion 301a linearly extending in whole of the target region 233, however, it is not illustrated in the drawings.

Figure 2C:
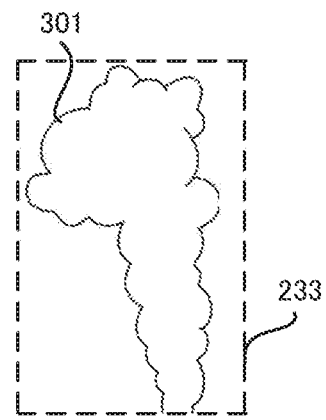
FIG. 2(c) is a planar view that illustrates one example of a border of smoke.

FIG. 2(c) illustrates, by using solid lines, one example of the border 301 determined in the target region 233 in which the smoke that may be one example of the target object exists. As illustrated in FIG. 2(c), the border 301 of the smoke does not include the border portion 301a linearly extending in whole of the target region 233.

As illustrated in FIG. 2(a) to FIG. 2(c), although the border 301 of the smoke does not include the border portion 301a linearly extending in at least one portion of the target region 233, the border 301 of the artificial structure includes the border portion 301a linearly extending in at least one portion of the target region 233. Namely, a distribution aspect of the border 301 of the smoke in the target region 233 is different from a distribution aspect of the border 301 of the artificial structure in the target region 233. The object identifying operation uses the difference between the distribution aspect of the border 301 of the smoke and the distribution aspect of the border 301 of the artificial structure in order to identify whether the target object is the smoke or the artificial structure.

(2-2) Specific Flow of Object Identifying Operation

Next, with reference to a flowchart in FIG. 3, the specific flow of the object identifying operation will be described. As illustrated in FIG. 3, each of the 3D object region determining part 131 and the human/vehicle determining part 132 obtains the image from the camera 11 (step S11). Moreover, the 3D object region determining part 131 obtains the distance information from the LIDAR 12 (step S11). Note that the image obtained at the step S11 is referred to as a "target image" in the following description, because the image obtained at the step S11 is the image that is a target for the object identifying operation. Moreover, below described processes from step S12 to step S21 are performed on the target image and the distance information obtained at the step S11. Therefore, it can be said that the ECU 13 repeatedly performs the object identifying operation (especially, the processes from the step S12 to the step S21) every time the ECU 13 obtains the target image and the distance information. In other words, it can be said that the ECU 13 starts to perform the object identifying operation in response to the obtainment of the target image and the distance information.

Then, the 3D object region determining part 131 determines the 3D object region 231 in the target image on the basis of the distance information (step S12). In the following description, one example of the operation of determining the 3D object region 231 will be briefly described, however, the 3D object region determining part 131 may determine the 3D object region 231 by using a method that is different from the below described method. For example, the 3D object region determining part 131 converts a 2D (two dimensional) coordinate system in the target image into a 3D coordinate system on the basis of the distance information. Then, the 3D object region determining part 131 classifies, as one region group, a group of small regions in the target image, wherein each small region is at a higher position than a road surface or a ground surface and a distance from each small region to the vehicle 1 is equal to or smaller than a predetermined threshold value. In this case, the 3D object region determining part 131 may classify, as one region group, a group of the small regions in the target image, wherein the distance from each small region to the vehicle 1 is equal to or smaller than the predetermined threshold value and the small regions are arranged along in a certain direction, because there is a high possibility that the 3D object is an object that extends in a certain direction (for example, a vertical direction, a horizontal direction, or a diagonal direction intersecting with the vertical direction and the horizontal direction) in the 3D coordinate system. Then, the 3D object region determining part 131 determine, as the 3D object region 231, a rectangular region that is obtained by connecting minimum and maximum coordinates in each region group on the 2D coordinate system. Since the rectangular region that is obtained by connecting the minimum and maximum coordinates in each region group is the 3D object region 231, the 3D object region 231 has such a characteristics that the 3D object region 231 becomes larger as the 3D object in the 3D object region 231 becomes larger.

Figure 4A:
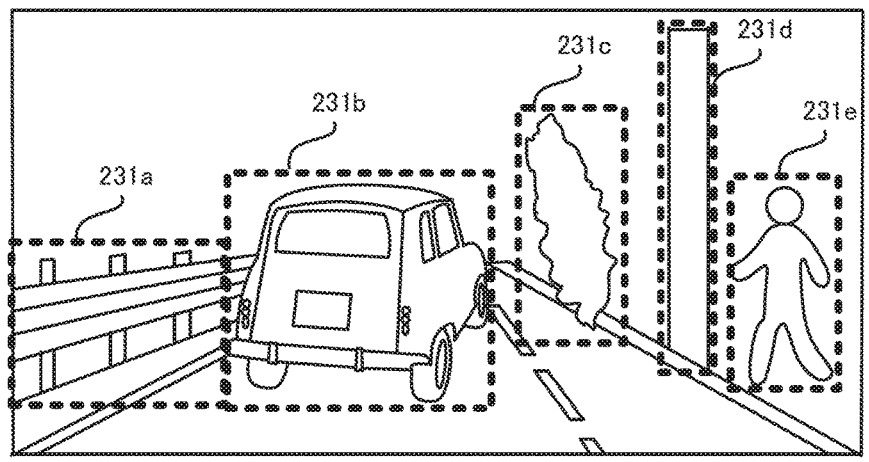
FIG. 4(a) is a planar view that illustrates one example of a three-dimensional object region.

If single 3D object is in the target image, the 3D object region determining part 131 determines single 3D object region 231 in which this single 3D object exists. On the other hand, if a plurality of 3D objects are in the target image, the 3D object region determining part 131 determines a plurality of 3D object regions 231 in which different 3D objects exist respectively. Therefore, each 3D object region 231 corresponds to a region in which single 3D object exists, as a general rule. Note that FIG. 4(a) illustrates a plurality of 3D object regions 231 determined when a plurality of 3D objects are in the target image. Specifically, FIG. 4(a) illustrates an example in which the 3D object region 231a in which the guard rail that is the 3D object exists, the 3D object region 231b in which the vehicle that is the 3D object exists, the 3D object region 231c in which the smoke that is the 3D object exists, the 3D object region 231d in which the power pole that is the 3D object exists and the 3D object region 231e in which the human (specifically, a pedestrian) that is the 3D object exists are determined.

Figure 4B:
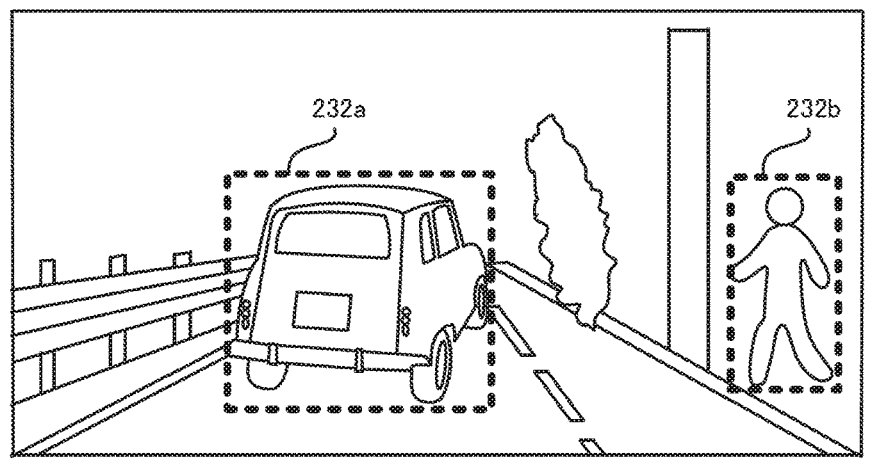
FIG. 4(b) is a planar view that illustrates one example of a human/vehicle region.

After (alternatively, in parallel with) the process at the step S12, the human/vehicle determining part 132 determines the human/vehicle region 232 in the target image (step S13). In the following description, one example of the operation of determining the human/vehicle region 232 will be briefly described, however, the human/vehicle determining part 132 may determine the human/vehicle region 232 by using a method that is different from the below described method. The human/vehicle determining part 132 determines the human/vehicle region 232 by analyzing the target image with an analyzing method that is different from an analyzing method used by the 3D object region determining part 131 to determine the 3D object region 231. A pattern matching method based on a template image representing the human or the vehicle is one example of this analyzing method. However, the human/vehicle determining part 132 may determine the human/vehicle region 232 by analyzing the target image with the analyzing method that is same as or similar to the analyzing method used by the 3D object region determining part 131 to determine the 3D object region 231. Note that FIG. 4(b) illustrates an example in which the human/vehicle region 232a in which the vehicle exists and the human/vehicle region 232b in which the human exists are determined.

Figure 4C:
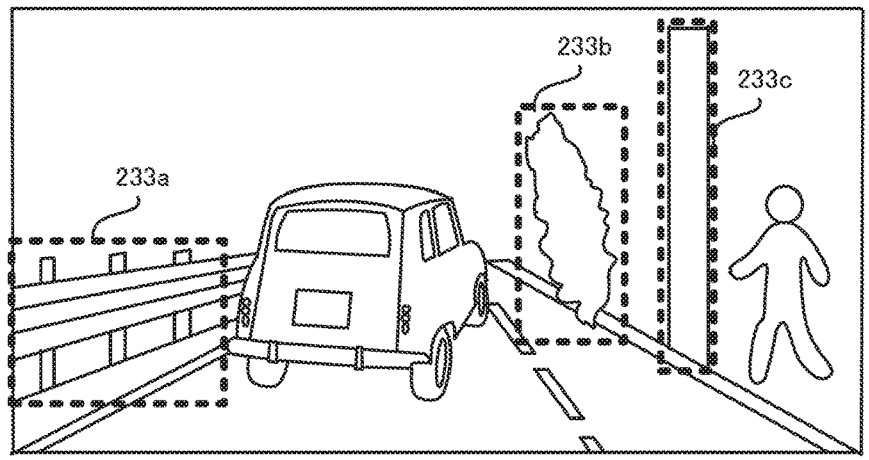
FIG. 4(c) is a planar view that illustrates one example of a target region.

Then, the target region determining part 133 determines the target region 233 on the basis of the 3D object region 231 determined at the step S12 and the human/vehicle region 232 determined at the step S13 (step S14). Specifically, the target region determining part 133 sets, as the target region 233, the 3D object region 231 that does not overlap with the human/vehicle region 232. On the other hand, the target region determining part 133 does not set, as the target region 233, the 3D object region 231 that overlaps with the human/vehicle region 232. Note that FIG. 4(c) illustrates the target regions 233 determined on the basis of the 3D object regions 231 in FIG. 4(a) and the human/vehicle regions 232 in FIG. 4(b). Specifically, the 3D object regions 231b and 231e in FIG. 4(a) overlap with the human/machine region 232a and 232b in FIG. 4(b), respectively. Therefore, the 3D object regions 231a, 231c and 231d are set as the target regions 233a, 233b and 233c, respectively. On the other hands, each of the 3D object regions 231b and 231e are not set as the target region 233.

Then, the ECU 13 performs processes from step S15 to step S20 on each target region 233 determined at the step S14.

Figure 5A:
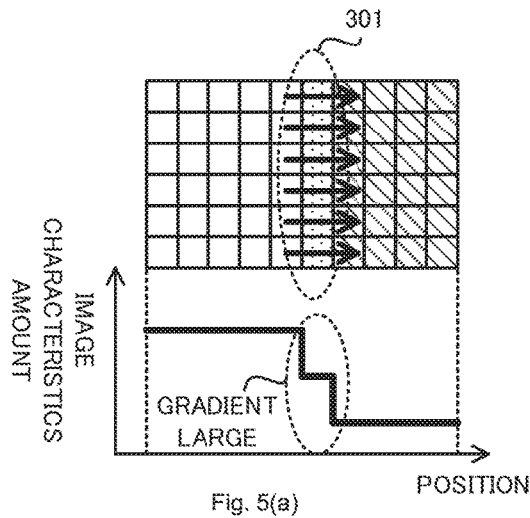
FIG. 5(a) is a schematic diagram that illustrates image characteristics amount at each of pixels included in a target image.
Figure 5B:
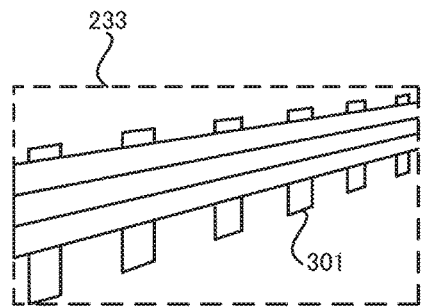
FIG. 5(b) is a planar view that illustrates one example of a border of a target object.

Specifically, firstly, the border determining part 134 determines the border 301 of the object in the target region 233 by analyzing the target region 233 (step S15). Here, as described above, the border 301 corresponds to the region including the pixels at each of which the gradient of the image characteristics amount is equal to or larger than the predetermined amount. If the target image includes only one region including the pixels at each of which the gradient of the image characteristics amount is equal to or larger than the predetermined amount, the border 301 corresponds to this one region. If the target image includes a plurality of regions each of which includes the pixels at each of which the gradient of the image characteristics amount is equal to or larger than the predetermined amount, the border 301 correspond to a group of these plurality of regions. Therefore, the border determining part 134 calculates the gradient of the image characteristics amount on the basis of the image characteristics amount at each pixel included in the target region 233, as illustrated in FIG. 5(a). The "gradient" may mean not only vector (typically, 2D vector) that is specified by derivative function of the image characteristics amount along each of the horizontal direction and the vertical direction at a certain pixel, but also any parameter that may specify a degree of variation of the image characteristics amount at a certain pixel. Then, the border determining part 134 determines the pixels at each of which the gradient of the image characteristics amount is equal to or larger than the predetermined amount. As a result, the region including the determined pixels is the border 301 of the object in the target region 233. For example, FIG. 5(b) illustrates one example of the border 301 determined in the target region 233 including the guard rail that may be one example of the target object. Note that each pixel included in the target image is one specific example of the above described "first pixel", and each pixel included in the border 301 (namely, each pixel at which the gradient of the image characteristics amount is equal to or larger than the predetermined amount) is one specific example of the above described "second pixel".

Note that an arrow in FIG. 5(a) represents a direction of the gradient (namely, a direction of the 2D vector, and a specific direction along which a degree of the variation of the image characteristics amount becomes relatively large or maximum at a certain pixel). FIG. 5(a) illustrates an example in which the direction of the gradient is defined as a direction along which the image characteristics amount varies to decrease. However, the direction of the gradient may be defined as a direction along which the image characteristics amount varies to increase.

If the image characteristics amount is luminance (alternatively, brightness), the pixels at each of which the gradient of the image characteristics amount is equal to or larger than the predetermined amount corresponds to what we call an edge. Thus, the border determining part 134 may determine the pixels at each of which the gradient of the image characteristics amount is equal to or larger than the predetermined amount by using what we call an edge detection method and determine the region including the determined pixels as the border 301. Of course, the image characteristics amount may be any parameter (for example, chroma, color phase or the like) that is different from the luminance.

However, the border determining part 134 may determine, as the border 301, the pixels at each of which the gradient of the image characteristics amount is equal to or larger than the predetermined amount (alternatively, a region in the target image that can be defined in connection with the pixels or without relation to the pixels), by performing a desired image analyzing on the target region, without directly using the image characteristics amount or directly calculating the gradient of the image characteristics amount.

Then, the border determining part 134 determines the specific border portion 302 that is at least one portion of the border 301, by analyzing the border determined at the step S15 (step S16). The specific border portion 302 corresponds to a region including the pixels at which the directions of the gradients of the image characteristics amounts are same as one another. Note that a condition where the directions of the gradients of the image characteristics amounts are same as one another includes not only a condition where the directions of the gradients are absolutely same as one another but also a condition where the difference of the directions of the gradients is small so that the directions of the gradients can be regarded to be substantially same as one another from a viewpoint of preventing a deterioration of accuracy of the object identifying operation although the directions of the gradients are actually different from one another. A condition where the directions of the gradients are not same as one another but the directions of the gradients are in a certain angle range as illustrated later by using FIG. 6(a) and FIG. 6(b) is one example of the condition where the difference of the directions of the gradients is small.

However, there is high possibility that the target image includes a plurality of regions each of which includes the pixels at which the directions of the gradients of the image characteristics amounts are same as one another depending on the direction of the gradient. For example, there is a high possibility that the target image includes at least a first region including the pixels at each of which the direction of the gradient of the image characteristics amount is a first direction and a second region including the pixels at each of which the direction of the gradient of the image characteristics amount is a second direction. The specific border portion 302 is a region whose distribution range in the target region 233 is at maximum, among these plurality of regions that correspond to different directions of the gradient, respectively. Note that the "distribution range" in the present embodiment means a range over which a certain region including a group of the pixels having same characteristics distributes. Namely, the "distribution range" means a range which this certain region covers with, exists at or is located at. Thus, the distribution range in the target region 233 means a range in the target region 233 which a certain region distributes over (namely, covers with, exists at or is located at). The range over which this certain region distributes becomes larger as the size of this certain region becomes larger. Thus, it can be said that the distribution of this certain region may be equivalent to the size (for example, a length, a dimension or a square measure) of this certain region.

In order to determine the specific border portion 302, the border determining part 134 firstly classifies the pixels included in the border 301 on the basis of the direction of the gradient of the image characteristics amount at each pixel. For example, as illustrated in FIG. 6(a), the border determining part 134 defines N (N is an integer larger than 1) angle ranges by dividing 360 degree at equal interval on the 2D coordinate system. The border determining part 134 determines which angle range among the N angle ranges the direction of the gradient at each pixel belongs to. As a result, the border determining part 134 classifies each pixel into a pixel belonging to the certain angle range including the direction of the gradient at each pixel.

Figure 6A:
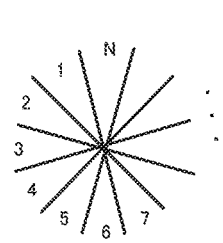
FIG. 6 Each of FIG. 6(a) and FIG. 6(b) is a planar view that illustrates a range of angle used for classifying the pixels included in the border.
Figure 6B:
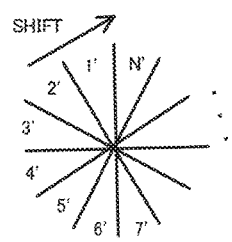

The border determining part 134 can usually determine the specific border portion 302 by which the accuracy of the object identifying operation is ensured effectively, by using the classification based on N angle ranges as illustrated in FIG. 6(a). However, in some cases, there is a possibility that the specific border portion 302 determined by using the classification based on N angle ranges may deteriorate the accuracy of the object identifying operation. Specifically, there is a possibility that the direction of the gradient at each pixel may be same as a direction corresponding to a border between two adjacent angle ranges. In this case, although the directions of the gradients at two pixels are substantially same as each other, it may be determined that the directions of the gradients at two pixels are not the directions belonging to same angle range. This classification may result in the deterioration of the accuracy of determining the specific border portion 302 that is the region including the pixels whose distribution range is at maximum in the target region 233. Thus, the border determining part 134 may define new N angle ranges that are obtained by shifting the N angle ranges by a certain angle smaller than an angle width of each angle range (for example, by a certain angle that is half of the angle width of each angle range) on the 2D coordinate system as illustrated in FIG. 6(b), in addition to the N angle ranges illustrated in FIG. 6(a), in order to prevent the deterioration of the accuracy of identifying the object. In this case, the border determining part 134 determines which angle range among the original N angle ranges and the new N angle ranges the direction of the gradient at each pixel belongs to.

Figure 7A:
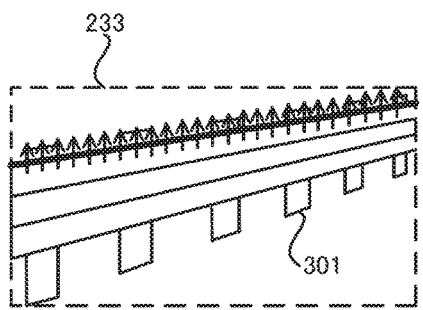
FIG. 7 Each of FIG. 7(a) and FIG. 7(b) is a planar view that illustrates a border portion including the pixels at which directions of the gradients are same as one another.
Figure 7B:
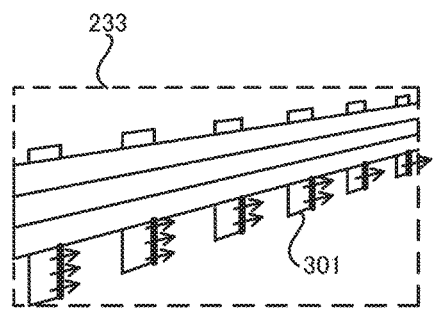

Then, the border determining part 134 calculates the total number of the pixels belonging to each angle range. Here, the target image is constituted by a unit of pixel. Thus, the distribution range of the pixels belonging to a certain angle range becomes larger in the target image as the total number of the pixels belonging to this certain angle range becomes larger. Namely, it can be said that the total number of the pixels belonging to this certain angle range is equivalent to the distribution range of the pixels belonging to a certain angle range. Namely, it can be said that the total number of the pixels belonging to this certain angle range is one example of the parameter representing the distribution range. Therefore, the border determining part 134 determines the angle range in which the number of the belonging pixels is at maximum, in order to determine the angle range in which the distribution range of the belonging pixels is at maximum. Then, the border determining part 134 determines, as the specific border portion 302, the region at which the pixels belonging to the determined angle range exist. For example, each of FIG. 7(a) and FIG. 7(b) illustrates one example of linear region at which the pixels belonging to a certain angle range exist among the pixels included in the border 301 of the guard rail, as well as illustrating the directions of the gradients of the image characteristics amounts at the pixels. In examples illustrated in FIG. 7(a) and FIG. 7(b), the total number of the pixels belonging to the angle range illustrated in FIG. 7(a) is larger than the total number of the pixels belonging to the angle range illustrated in FIG. 7(b). Namely, the distribution range of the pixels belonging to the angle range illustrated in FIG. 7(a) is larger than the distribution range of the pixels belonging to the angle range illustrated in FIG. 7(b). Thus, the border determining part 134 does not determine, as the specific border portion 302, the region at which the pixels belonging to the angle range illustrated in FIG. 7(b) exist. On the other hand, the border determining part 134 determines, as the specific border portion 302, the region at which the pixels belonging to the angle range illustrated in FIG. 7(a) exist, if the total number of the pixels belonging to the angle range illustrated in FIG. 7(a) is at maximum. Note that each of the pixels belonging to the angle range illustrated in FIG. 7(a) (namely, each pixel included in the specific border portion 302) is one specific example of the above described "third pixel" and each of the pixels belonging to the angle range illustrated in FIG. 7(b) (namely, each of the pixels that are not included in the specific border portion 302 but that are included in the border 302 and at which the directions of the gradients of the image characteristics amounts are same as one another) is one specific example of the above described "fourth pixel".

Figure 8A:
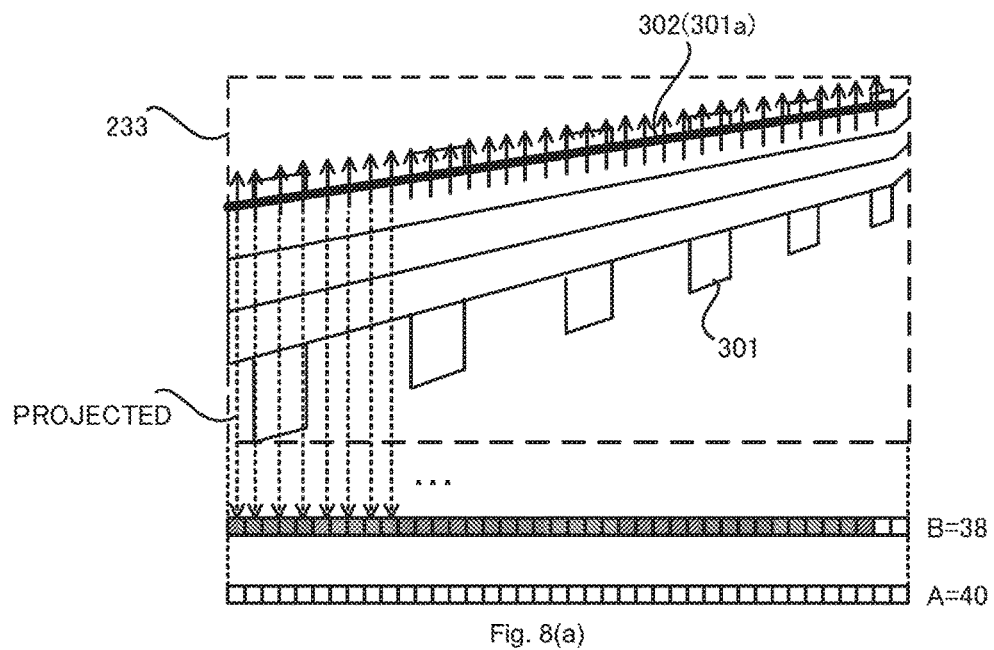
FIG. 8 Each of FIG. 8(a) and FIG. 8(b) is schematic diagram that illustrates an operation of calculating a first parameter and a second parameter on the target region.

Then, the identification parameter calculating part 135 calculates the identification parameter P on the basis of the target region 233 determined at the step S14 and the specific border portion 302 determined at the step S16 (step S17). The identification parameter P is a parameter that is determined on the basis of a first parameter A relating to the target region 233 and a second parameter B relating to the specific border portion 302. In the following description, one specific example of calculating the identification parameter P will be described with reference to FIG. 8(a). FIG. 8(a) illustrates one example of the border 301 determined in the target region 233 in which the guard rail that may be the target object exists. Moreover, the specific border portion 302 is illustrated by thick solid line in FIG. 8(a).

As illustrated in FIG. 8(a), the first parameter A represents the number of a row of the pixels arranged along a longer side of the target region 233. The identification parameter calculating part 135 calculates the number of the pixels arranged along the longer side of the target region 233 by analyzing the target region 233. In an example illustrated in FIG. 8(a), the number of the pixels arranged along the longer side of the target region 233 is 40, and thus the first parameter A represents a value of "40".

On the other hand, the second parameter B represents the number of the pixels onto which the specific border portion 302 is projected when the specific border portion 302 is projected onto the longer side of the target region 233, among a row of the pixels arranged along the longer side of the target region 233. Namely, the second parameter B represents the number of the pixels onto each of which the pixel included in the specific border portion 302 is projected when the pixels included in the specific border portion 302 are projected onto the longer side of the target region 233, among a row of the pixels arranged along the longer side of the target region 233. The identification parameter calculating part 135 determines the pixels onto which the specific border portion 302 is projected when the specific border portion 302 is projected onto the longer side of the target region 233 and calculates the number of the determined pixels by analyzing the target region 233. In the example illustrated in FIG. 8(a), the number of the pixels onto which the specific border portion 302 is projected is 38, and thus the second parameter B represents a value of "38".

Figure 8B:
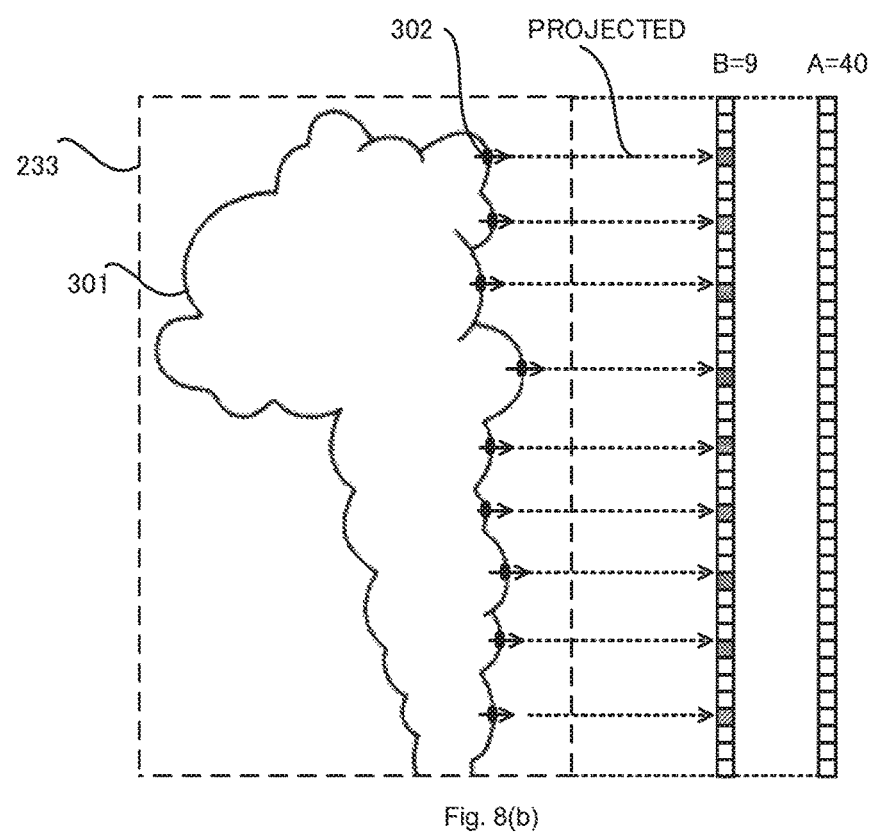

Note that FIG. 8(b) illustrates one example of each of the first parameter A and the second parameter B determined from the target region 233 in which the smoke that may be the target object exists. In an example illustrated in FIG. 8(b), the number of the pixels arranged along the longer side of the target region 233 is 40, and thus the first parameter A represents a value of "40". In addition, in the example illustrated in FIG. 8(b), the number of the pixels onto which the specific border portion 302 is projected is 9, and thus the second parameter B represents a value of "9".

Then, the identification parameter calculating part 135 calculates a ratio of the second parameter B to the first parameter A (namely, B/A). The ratio of the second parameter B to the first parameter A is used as the identification parameter P. Thus, it can be said that the identification parameter P substantially represents a distribution ratio of the specific border portion 302 projected onto the longer side of the target region 233 to the longer side of the target region 233.

Again in FIG. 3, then, the object identifying part 136 determines whether or not the identification parameter P calculated at the step S17 is larger than a predetermined threshold value TH1 (step S18). As a result of the determination at the step S18, if it is determined that the identification parameter P is larger than the threshold value TH1 (step S18: Yes), the object identifying part 136 identifies the object as the artificial structure (step S19). On the other hand, as a result of the determination at the step S18, if it is determined that the identification parameter P is smaller than the threshold value TH1 (step S18: No), the object identifying part 136 identifies the object as the smoke (step S20). Note that the object identifying part 136 may identify the object as the artificial structure or the smoke if it is determined that the identification parameter P is equal to the threshold value TH1. The ECU 13 repeats the above described processes from the step S15 to the step S20 for all of the target areas determined at the step S14 (step S21).

Here, as illustrated in FIG. 8(a), if the target object is the artificial structure, the border 301 of the target object includes the border portion 301a linearly extending in at least one portion of the target region 233. Since the border portion 301a linearly extends, there is a high possibility that the border portion 301a includes the plurality of pixels at which the directions of the gradients of the image characteristics are same as one another. Thus, there is a high possibility that the specific border portion 302 that is the region including the pixels at which the directions of the gradients of the image characteristics are same as one another also includes the border portion 301a. Thus, the second parameter B in the case where the target object is the artificial structure is larger than the second parameter B in the case where the target object is not the artificial structure (for example, is the smoke). In other words, the second parameter B is closer to the first parameter A in the case where the target object is the artificial structure, compared to the case where the target object is not the artificial structure. As a result, the identification parameter P in the case where the target object is the artificial structure is larger than the identification parameter P in the case where the target object is not the artificial structure. Therefore, there is a relatively high possibility that the target object is the artificial structure, if the identification parameter P is larger than the threshold value TH1, compared to the case where the identification parameter P is smaller than the threshold value TH1. On the other hand, as illustrated in FIG. 8(b), if the target object is the smoke, the border 301 of the target object does not include the border portion 301a linearly extending in at least one portion of the target region 233. Namely, there is a high possibility that the specific border portion 302 does not include the border portion 301a linearly extending in at least one portion of the target region 233. Thus, the second parameter B in the case where the target object is the smoke is smaller than the second parameter B in the case where the target object is not the smoke (for example, is the artificial structure). In other words, the second parameter B is more away from the first parameter A in the case where the target object is the smoke, compared to the case where the target object is not the smoke (for example, is the artificial structure). As a result, the identification parameter P in the case where the target object is the smoke is smaller than the identification parameter P in the case where the target object is not the smoke. Therefore, there is a relatively high possibility that the target object is the smoke, if the identification parameter P is smaller than the threshold value TH1, compared to the case where the identification parameter P is larger than the threshold value TH1. Therefore, the object identifying part 136 is capable of identifying whether the target object is the smoke or the artificial structure by comparing the identification parameter P and the threshold value TH1.

It is preferable that the threshold value TH1 be set to an appropriate value that is allowed to discriminate the identification parameter P calculated when the target object is the smoke from the identification parameter P calculated when the target object is the artificial structure. For example, as illustrated in FIG. 9, an appearance frequency of the identification parameters P calculated when the target objects are different smokes becomes relatively large at a region centered at the relatively small identification parameter P1. On the other hand, as illustrated in FIG. 9, the appearance frequency of the identification parameters P calculated when the target objects are different artificial structure becomes relatively large at a region centered at the relatively large identification parameter P2 (P2>P1). Therefore, the threshold value TH1 may be set to an appropriate value that is allowed to discriminate the distribution range of the identification parameters P calculated when the target objects are different smokes from the distribution range of the identification parameters P calculated when the target objects are different artificial structures.

As described above, the ECU 13 in the present embodiment is capable of identifying whether the target object is the smoke or the artificial structure on the basis of the difference between the distribution aspect of the border 301 of the smoke and the distribution aspect of the border 301 of the artificial structure. Here, even when a color (alternatively, another characteristics, same applies to the following explanation) of the smoke in the target image is vastly different from a color of background behind the smoke, the fact remains that the border 301 of the smoke does not include the border portion 301a linearly extending in at least one portion of the target region 233. Thus, even when the color of the smoke is vastly different from the color of the background, the second parameter B is relatively small and thus the identification parameter P is relatively small, as with the case where the color of the smoke is not vastly different from the color of the background. Therefore, even when the color of the smoke is vastly different from the color of the background, the ECU 13 is capable of identifying whether or not the target object is the smoke with the same accuracy as the object identification operation performed when the color of the smoke is not vastly different from the color of the background. Similarly, even when a color of the artificial structure in the target image is not vastly different from a color of background behind the artificial structure, the fact remains that the border 301 of the artificial structure includes the border portion 301a linearly extending in at least one portion of the target region 233. Thus, even when the color of the artificial structure is not vastly different from the color of the background, the second parameter B is relatively large and thus the identification parameter P is relatively large, as with the case where the color of the artificial structure is vastly different from the color of the background. Therefore, even when the color of the artificial structure is not vastly different from the color of the background, the ECU 13 is capable of identifying whether or not the target object is the artificial structure with the same accuracy as the object identification operation performed when the color of the artificial structure is vastly different from the color of the background. Therefore, the ECU 13 is capable of identifying the target object more accurately than an object identifying apparatus in a comparison example that is configured to identify the object in the image on the basis of the level of the edge strength (namely, the magnitude itself of the gradient of the luminance that is one example of the image characteristics).

Moreover, the ECU 13 is capable of eliminate one portion of the 3D object regions 231 from the target region 233 on the basis of the determination result of the human/vehicle determining part 132. Therefore, the ECU 13 does not have to perform a process for determining the border 301 and the specific border portion 302 on one portion of the 3D object regions 231. As a result, processing load for the object identifying operation can be reduced. Moreover, a deterioration of the identification accuracy that is caused by wrongly identifying that the human or the vehicle is the smoke or the artificial structure can be suppressed.

Moreover, the ECU 13 is capable of identifying the object by using the first parameter A representing the number of a row of the pixels arranged along the longer side of the target region 233 and the second parameter B representing the number of the pixels onto which the specific border portion 302 is projected among a row of the pixels arranged along the longer side of the target region 233. Namely, the ECU 13 is capable of identifying the object by using the identification parameter P relating to the length of the longer side of the target region 233. Here, as described above, there is a high possibility that the target object such as the artificial structure and the smoke extends in a certain direction in the 3D space. Thus, there is a high possibility that the border portion 301*a* linearly extending in at least one portion of the target region 233 extends along the longer side of the target region 233. Therefore, if the identification parameter P relating to the longer side of the target region 233 is used, there is a high possibility that the identification parameter P calculated when the target object is the smoke (namely, calculated when there is no border portion 301*a* linearly extending along the longer side of the target region 233) becomes a value that can be clearly discriminated from the identification parameter P calculated when the target object is the artificial structure (namely, calculated when there is the border portion 301*a* linearly extending along the longer side of the target region 233). Therefore, the accuracy of identifying the object is expected to improve.

(3) Modified Example

In the above described description, the border determining part 134 determines the angle range in which the number of the belonging (i.e. classified) pixels is at maximum, and the border determining part 1345 determines, as the specific border portion 302, the region at which the pixels belonging to the determined angle range exist. However, the border determining part 134 may determine one angle range in which the number of the belonging pixels is not maximum but is equal to or larger than a predetermined number, and the border determining part 134 may determine, as the specific border portion 302, the region at which the pixels belonging to the determined one angle range exist. In other words, the border determining part 134 may determine one angle range in which the distribution range of the belonging pixels in the target region 233 is not maximum but is equal to or larger than a predetermined range, and the border determining part 134 may determine, as the specific border portion 302, the region at which the pixels belonging to the determined one angle range exist. The predetermined number (alternatively, the predetermined range) in this case may be set on the basis of the above described difference between the distribution aspect of the border 301 of the smoke and the distribution aspect of the border 301 of the artificial structure. Specifically, the border 301 of the artificial structure may include the border portion 301*a* linearly extending in one portion of the target region 233. Thus, there is a relatively high possibility that the number of the pixels at which the directions of the gradients of the image characteristics amounts are same as one another among the pixels included in the border 301 of the artificial structure is relatively large so that the pixels can constitute the border portion 301*a* linearly extending in at least one portion of the target region 233. Thus, the number of the pixels that can constitute the border portion 301*a* linearly extending in at least one portion of the target region 233 may be set to the predetermined number. Alternatively, the distribution range of the pixels that can distribute in the target region 233 to constitute the border portion 301*a* linearly extending in at least one portion of the target region 233 may be set to the predetermined range.

If the number of the pixels at each of which the direction of the gradient is one direction is larger than the number of the pixels at each of which the direction of the gradient is another direction different from one direction, it is estimated that the pixels at each of which the direction of the gradient is one direction rather than the pixels at each of which the direction of the gradient is another direction constitute the linearly extending border portion 301*a*. Thus, the border determining part 134 may determine one angle range in which the number of the belonging pixels is larger than the number of the pixels belonging to another angle range, and the border determining part 134 may determine, as the specific border portion 302, the region at which the pixels belonging to the determined one angle range exist. In other words, the border determining part 134 may determine one angle range in which the distribution range of the belonging pixels in the target region 233 is larger than the distribution range of the pixels belonging to another angle range, and the border determining part 134 may determine, as the specific border portion 302, the region at which the pixels belonging to the determined one angle range exist.

In the above described description, the first parameter A represents the number of a row of the pixels arranged along the longer side of the target region 233. Here, the number of a row of the pixels arranged along the longer side of the target region 233 becomes larger as the longer side of the target region 233 becomes longer. Therefore, it can be said that the number of a row of the pixels arranged along the longer side of the target region 233 is equivalent to a length of the longer side of the target region 233. Thus, the first parameter A may be any parameter that is different from the number of a row of the pixels arranged along the longer side of the target region 233 but represents the length of the longer side of the target region 233. In other words, the first parameter A may be any parameter that becomes larger as the longer side of the target region 233 becomes longer.

Figure 10A:
FIG. 10 Each of FIG. 10(a), FIG. 10(b)
FIG. 10(c) is planar view that illustrate another example of a target represented by the first parameter.
Figure 10B:
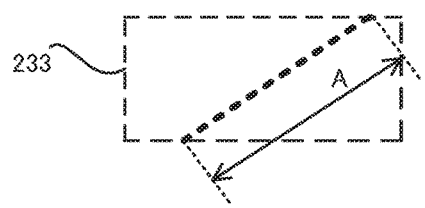
Figure 10C:
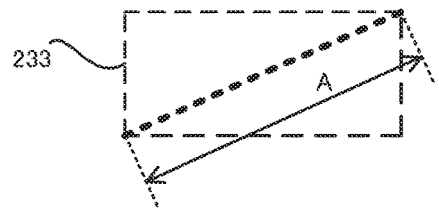

Alternatively, as illustrated in FIG. 10(*a*), the first parameter A may be any parameter representing a length of a shorter side of the target region 233. Namely, the first parameter A may be any parameter that becomes larger as the shorter side of the target region 233 becomes longer. Alternatively, as illustrated in FIG. 10(*b*), the first parameter A may be any parameter representing a length (for example, the length itself, the length of the line along the longer side of the target region 233, or the length of the line along the shorter side of the target region 233) of a line that is obtained by connecting two points on an outer rim of the target region 233. Namely, the first parameter A may be any parameter that becomes larger as the line that is obtained by connecting two points on the outer rim of the target region 233 becomes longer. Note that FIG. 10(c) illustrates a diagonal line of the target region 233 as one example of the line that is obtained by connecting two points on the outer rim of the target region 233. In any cases, the first parameter A is a parameter that becomes larger as the size of the target region 233 becomes larger. Thus, it can be said that the first parameter A is substantially a parameter representing the size (especially, a length) of the target region 233.

In the above described description, the second parameter B represents the number of the pixels onto which the specific border portion 302 is projected when the specific border portion 302 is projected onto the longer side of the target region 233, among a row of the pixels arranged along the longer side of the target region 233. Here, the number of the pixels onto which the specific border portion 302 is projected becomes larger as the specific border portion 302 becomes longer (especially, the specific border portion 302 becomes longer along the longer side of the target region 233). Therefore, it can be said that the number of the pixels onto which the specific border portion 302 is projected is equivalent to the length (especially, the length along the longer side of the target region 233 whose length is represented by the first parameter A) of the specific border portion 302. Thus, the second parameter B may be any parameter that is different from the number of the pixels onto which the specific border portion 302 is projected but represents the length of the specific border portion 302. In other words, the second parameter B may be any parameter that becomes larger as the specific border portion 302 becomes longer.

Note that there is a high possibility that the specific border portion 302 corresponds to a plurality of regions each of which includes a small number of pixels as illustrated in FIG. 8(b), if the target object is the smoke. Even in this case, each region constituting the specific border portion 302 can be determined as a dimension of length, although each region is very short. Thus, the specific border portion 302 can be also determined as the dimension of length. Specifically, the specific border portion 302 can be determined by a parameter of total sum of the lengths of the plurality of regions constituting the specific border portion 302, for example. However, if the target object is the smoke, it can be said that the length of the specific border portion 302 is substantially equivalent to the distribution range (especially, the distribution range along the longer side of the target region 233) of the specific border portion 302 in the target region 233. Note that it can be also said that the length of the specific border portion 302 is substantially equivalent to the distribution range (especially, the distribution range along the longer side of the target region 233) of the specific border portion 302 in the target region 233 even in the case where the target object is the artificial structure.

In the following description, one example of any parameter representing the length of the specific border portion 302 will be described. When the specific border portion 302 is projected onto the longer side of the target region 233, a projected line that is a line onto which the specific border portion 302 is projected is determined on the longer side. The projected line becomes longer as the specific border portion 302 becomes longer. Thus, the second parameter B may be any parameter representing the length of the projected line that is obtained by projecting the specific border portion 302 onto the longer side of the target region 233. If the first parameter A represents the length of the shorter side of the target region 233, the second parameter B may be any parameter representing the length of the projected line that is obtained by projecting the specific border portion 302 onto the shorter side of the target region 233. If the first parameter A represents the length of the line obtained by connecting two points on the outer rim of the target region 233, the second parameter B may be any parameter representing the length of the projected line that is obtained by projecting the specific border portion 302 onto this line. Alternatively, the second parameter B may be any parameter representing the length itself of the specific border portion 302. For example, the second parameter B may represents the number of the pixels included in the specific border portion 302. In any cases, the second parameter B is a parameter that becomes larger as the size of the specific border portion 302 becomes larger. Thus, it can be said that the second parameter B is substantially a parameter representing the size (especially, the length) of the specific border portion 302.

As illustrated in FIG. 11, a plurality of border portions 301a each of which linearly extends in at least one portion of the target region 233 may exist in the target region 233. Here, if the directions of the gradients of the image characteristics amounts at the pixels included in the plurality of border portions 301a are same as one another, the specific border portion 302 includes these plurality of border portions 301a. In this case, the second parameter B may represent the number of the pixels onto which at least one of the plurality of border portions 301a is projected when at least one of the plurality of border portions 301a is projected onto the longer side of the target region 233, among a row of the pixels arranged along the longer side of the target region 233. For example, the second parameter B may represent the number of the pixels onto which only one of the plurality of border portions 301a is projected when only one of the plurality of border portions 301a is projected onto the longer side of the target region 233, among a row of the pixels arranged along the longer side of the target region 233. For example, the second parameter B may represent the number of the pixels onto which at least one one of the plurality of border portions 301a is projected when all of the plurality of border portions 301a are projected onto the longer side of the target region 233, among a row of the pixels arranged along the longer side of the target region 233. Alternatively, the second parameter B may be any parameter relating to the length of at least one of the plurality of border portions 301a. For example, the second parameter B may represent the total sum of the lengths of the plurality of border portions 301a. For example, the second parameter B may represent the length of any one of the plurality of border portions 301a. However, it is preferable that the second parameter B be a parameter considering (reflecting) the lengths of all of the plurality of border portions 301a constituting the specific border portion 302, from a viewpoint of improving the identification accuracy.

As described above, the object identifying operation in the present embodiment is an operation based on the premise that the border 301 of the artificial structure includes the border portion 301a linearly extending in at least one portion of the target region 233. Thus, it is preferable that the specific border portion 302 determined when the target object is the artificial structure be the linearly extending border portion 301a and the specific border portion 302 determined when the target object is not the artificial structure be not the linearly extending border portion 301a, in order to improve the accuracy of identifying whether or not the target object is the artificial structure. Thus, the border determining part 134 may perform a process for extracting the pixels (for example, the edge) that distribute to linearly extend among the pixels included in the specific border portion and then project the extracted pixels onto the longer side of the target region 233. As one example of the process for extracting the pixels that distribute to linearly extend, there is a process for determining a line that can be determined on the basis of the pixels included in the specific border portion 302 by performing a line detection process such as a Hough Transformation on the pixels included in the specific border portion 302, and then extracting, as the pixels that distribute to linearly extend, the pixels each of which is away from the determined line by a predetermined distance or less among the pixels included in the specific border portion 302.

In the above described description, single threshold value TH1 is used as the threshold value that is to be compared with the identification parameter P. However, there is a possibility that the target object is not the smoke and the artificial structure if the identification parameter P is near the above described threshold value TH1, as illustrated in the graph in FIG. 9. Moreover, there is a possibility that the target object is not the smoke if the identification parameter P is much smaller than the above described threshold value TH1. Moreover, there is a possibility that the target object is not the artificial structure if the identification parameter P is much larger than the above described threshold value TH1. Thus, a plurality of threshold values TH may be used as the threshold values that are to be compared with the identification parameter P. For example, as illustrated in FIG. 12, the object identifying part 136 may identify that the target object is the smoke if the identification parameter P is larger than a predetermined threshold value TH2 (note that TH2<P1) and smaller than a predetermined threshold value TH3 (note that P1<TH3≤TH1). The object identifying part 136 may identify that the target object is the artificial structure if the identification parameter P is larger than a predetermined threshold value TH4 (note that TH1≤TH4<P2) and smaller than a predetermined threshold value TH5 (note that P2<TH5). The object identifying part 136 may identify that the target object is another object different from the smoke and the artificial structure if the identification parameter P is smaller than the threshold value TH2, if the identification parameter P is larger than the threshold value TH3 and smaller than the threshold value TH4 or if the identification parameter P is larger than the threshold value TH5. By using these threshold values TH, the identification accuracy improves.

In the above described description, the identification parameter P is the ratio of the second parameter B to the first parameter A. However, the identification parameter P may be a difference between the first parameter A and the second parameter B. In this case, the object identifying part 136 identifies the object by comparing the difference and a predetermined threshold value TH6. Specifically, the object identifying part 136 may identify that the target object is the artificial structure if the difference is smaller than the threshold value TH6. The object identifying part 136 may identify that the target object is the smoke if the difference is larger than the threshold value TH6. Note that the threshold value TH6 may be set as with the threshold value TH1.

Each of the ratio of the second parameter B to the first parameter A and the difference between the first parameter A and the second parameter B corresponds to a parameter representing a relative relationship between the first parameter A and the second parameter B. Therefore, the identification parameter P may be any parameter representing the relative relationship between the first parameter A and the second parameter B. In this case, the object identifying part 136 may identify that the target object is the artificial structure if the relative relationship is a first relationship. The object identifying part 136 may identify that the target object is the smoke if the relative relationship is a second relationship (alternatively, is not the first relationship). Note that the first relationship and the second relationship may be set as with the threshold value TH1.

In the above described description, each of the 3D object region 231, the human/vehicle region 232 and the target region 233 is the rectangular region. However, each of the 3D object region 231, the human/vehicle region 232 and the target region 233 may be a region having any shape different from the rectangular shape (for example, may be a polygonal shape, a circular shape or an oval shape). Even in this case, the first parameter A may be any parameter representing the number of a row of the pixels arranged along the line (or a curved line) that is obtained by connecting two points on the outer rim of the target region 233 (alternatively, any parameter corresponding to the above described modified example of the first parameter A). The second parameter B may be any parameter representing the number of the pixels onto which the specific border portion 302 is projected when the specific border portion 302 is projected onto the line (or the curved line) that is obtained by connecting two points on the outer rim of the target region 233, among a row of the pixels arranged along the line (or the curved line) that is obtained by connecting two points on the outer rim of the target region 233 (alternatively, any parameter corresponding to the above described modified example of the second parameter B).

The human/vehicle region 232 determined by the human/vehicle determining part 132 is used to eliminate one portion of the 3D object regions 231 from the target region 233. Namely, it can be said that the human/vehicle determining part 132 determines the human and the vehicle corresponding to the objects that can be eliminated from the target object for the object identifying operation. Thus, the human/vehicle determining part 132 may determine an eliminated region in which the object that can be eliminated from the target object for the object identifying operation exists, in addition to or instead of determining the human/vehicle region 232 in which the human or the vehicle exists. In this case, the target region determining part 133 sets, as the target region 233, the 3D object region 231 that does not overlap with the eliminated region. The target region determining part 133 does not set, as the target region 233, the 3D object region 231 that overlaps with the eliminated region.

In the above described description, the determination result of the human/vehicle determining part 132 is used by the target region determining part 133 to eliminate one portion of the 3D object regions 231 from the target region 233. However, the determination result of the human/vehicle determining part 132 may be used when the object identifying part 136 identifies the object. A flow of this modified example of the object identifying operation will be described with reference to FIG. 13. Note that the structure of the vehicle 1 performing the modified example of the object identifying operation is same as the structure of the vehicle 1 illustrated in FIG. 1 (however, it is different in that the determination result of the human/vehicle determining part 132 is outputted to the object identifying part 136 instead of the target region determining part 133), and thus the description about the structure of the vehicle 1 is omitted.

As illustrated in FIG. 13, even in the modified example, the processes from the step S11 to the step S13 are performed. In the modified example, the target region determining part 133 directly sets the 3D object region 231 as the target region 233 without using the human/vehicle region 232 (step S31). Then, even in the modified example, the processes from the step S15 to the step S18 are performed. If it is determined that the identification parameter P is larger than the threshold value TH1 (step S18: Yes), the object identifying part 136 identifies the object as the artificial structure (step S19). If it is determined that the identification parameter P is smaller than the threshold value TH1 (step S18: No), the object identifying part 136 determines whether or not the target region 233 that is the target for the object identifying operation overlaps with the human/vehicle region 232 (step S32). If it is determined that the target region 233 does not overlap with the human/vehicle region 232 (step S32: No), the object identifying part 136 identifies the object as the smoke (step S20). If it is determined that the target region 233 overlaps with the human/vehicle region 232 (step S32: Yes), the object identifying part 136 identifies the object as another object different from the smoke and the artificial structure (step S33). According to this modified example of the object identifying operation, the accuracy of identifying the object is expected to improve as with the case where the determination result of the human/vehicle determining part 132 is used by the target region determining part 133 to eliminate one portion of the 3D object regions 231 from the target region 233.

The vehicle 1 may not have the camera 11. In this case, the vehicle 1 may perform the above described object identifying operation on the image captured by the camera that is located outside the vehicle 1.

The vehicle 1 may have any sensor that is capable of detecting the distance information, in addition to or instead of the LIDAR 12. A stereo camera or a radar is one example of this sensor. Note that the stereo camera may be used as the camera 11 when the vehicle 1 has the stereo camera. Alternatively, the vehicle 1 may not have the LIDAR 12 (alternatively, any sensor that is capable of detecting the distance information). In this case, the vehicle 1 may obtain the distance information from the LIDAR (alternatively, any sensor that is capable of detecting the distance information) that is located outside the vehicle 1.

The ECU 13 may not include the human/vehicle determining part 132 and the target region determining part 133. In this case, the 3D object region 231 is directly used as the target region 233.

At least one portion of the feature in the above described embodiment and the modified examples may be eliminated or modified accordingly. At least one portion of the feature in the above described embodiment and the modified example may be combined with at least another one portion of the feature in the above described embodiment and the modified example.

This application is based upon and claims the benefit of priority of the prior Japanese Patent Application No. 2016-118233, filed on Jun. 14, 2016, the entire contents of which are incorporated herein by reference. In addition, the entire contents of the above described Patent Literatures 1 to 8 is incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. An object identifying apparatus, which involve such changes, are also intended to be within the technical scope of the present invention.

REFERENCE SIGNS LIST 1 vehicle
11 camera
12 LIDAR
13 ECU
131 3D (three dimensional) object region determining part
132 human/vehicle determining part
133 target region determining part
134 border determining part
135 identification parameter calculating part
136 object identifying part
231 3D (three dimensional) object region
232 human/vehicle region
233 target region
301 border
302 specific border portion

The invention claimed is:

1. An object identifying apparatus comprising:
an Electronic Control Unit (ECU) programmed to:
determine, as a first region in an image, a region in the image having an object that is an identification target;
determine a main border portion in the first region, the main border portion being at least one portion of a border of the object at which a degree of gradient of image characteristics amount is equal to or larger than a predetermined amount, wherein the main border portion is a portion at which a direction of the gradient of the image characteristics amount is one direction or within one direction range, and a distribution range of the main border portion in the first region is larger than another distribution range of another border portion in which the direction or the direction range of the gradient of the image characteristics amount is another direction or direction range different from the one direction or the one direction range; and
identify a type of object of the object that is the identification target based on a first parameter representing a length along a side of the first region and a second parameter representing a sum of lengths of the side of the first region onto which the main border portion is projected on, wherein the sum of lengths includes more than one edge being summed together on one side.

2. The object identifying apparatus according to claim 1, wherein the ECU is programmed to identify the type of object of the object based on a relationship between the first parameter and the second parameter.

3. The object identifying apparatus according to claim 2, wherein the ECU is programmed to:
identify that the type of object of the object is smoke, if the relationship between the first parameter and the second parameter is a first relationship that is set in advance as a relationship observed when the type of object is the smoke, and identify that the type of object of the object is an artificial structure, if the relationship between the first parameter and the second parameter is a second relationship that is different from the first relationship, the second relationship being set in advance as a relationship observed when the type of object is an artificial structure.

4. The object identifying apparatus according to claim 2, wherein the relationship between the first parameter and the second parameter includes at least one of a ratio of the second parameter to the first parameter or a difference between the first parameter and the second parameter.

5. The object identifying apparatus according to claim 4, wherein the ECU is programmed to:

identify that the type of object of the object is smoke, if the ratio is smaller than a first threshold value or the difference is larger than a second threshold value, and identify that the type of object of the object is an artificial structure, if the ratio is larger than a third threshold value that is equal to or larger than the first threshold value or the difference is smaller than a fourth threshold value that is equal to or smaller than the second threshold value.

6. The object identifying apparatus according to claim 1, wherein the first parameter represents, as the length along the side of the target region, a length of a first line that is obtained by connecting two points on an outer border of the first region, and the second parameter represents, as the sum of lengths of the side of the first region onto which the main border portion is projected on, a sum of lengths which are obtained by projecting pixels of the main border portion onto the first line.

7. The object identifying apparatus according to claim 6, wherein a shape of the first region is a rectangle shape, and
the first line is one side of the first region.

8. The object identifying apparatus according to claim 7, wherein the one side is a longer side of the rectangle shape of the first region.

9. The object identifying apparatus according to claim 1, wherein the ECU is programmed to:

determine the first region by analyzing the image with a first analysis method, determine a second region in the image by analyzing the image with the first analysis method or a second analysis method different from the first analysis method, a predetermined object that is allowed to be eliminated from the identification target being in the second region, and determine the main border portion in the first region is a border portion in the first region that does not overlap with the second region.

10. The object identifying apparatus according to claim 1, wherein the ECU is programmed to:

determine the first region by analyzing the image with a first analysis method, determine a second region in the image by analyzing the image with the first analysis method or a second analysis method different from the first analysis method, a predetermined object that is allowed to be eliminated from the identification target being in the second region, and determine the main border portion based on the first parameter, the second parameter and the determined second region.

11. The object identifying apparatus according to claim 1, wherein the border of the object includes a plurality of second pixels at each of which a degree of the gradient of the image characteristics amount is equal to or larger than a predetermined amount, the plurality of second pixels being at least one portion of a plurality of first pixels included in the image, the main border portion includes a plurality of third pixels, the plurality of third pixels are at least one portion of the plurality of second pixels, the direction or direction range of the gradient of the image characteristics amount at each of the plurality of third pixels is the one direction or the one direction range, and the number of the third pixels is larger than the number of a plurality of fourth pixels at each of which the direction of the gradient of the image characteristics amount is another direction or another direction range that is different from the one direction or the one direction range.

12. An object identifying apparatus comprising:
an Electronic Control Unit (ECU) programmed to:

determine, as a first region in an image, a region in the image having an object that is an identification target;

determine, as a border of the object that is the identification target, pixels at each of which a gradient of image characteristics amount is equal to or larger than a predetermined amount;

determine a main border portion that is at least one portion of the border, the determining of the main border portion including: (i) determining which angle range among a plurality of angle ranges the direction of the gradient of the image characteristics amount at each pixel belongs to, (ii) calculating a total number of the pixels belonging to each angle range, (iii) determining the angle range in which the total number of the belonging pixels is at a maximum, in order to determine the angle range in which a distribution range of the belonging pixels is at the maximum, and (iv) determining, as the main border portion, the region at which the pixels belonging to the determined angle range exist;

determine a first parameter representing a length along a side of the first region and a second parameter representing a sum of lengths of the side of the first region onto which the main border portion is projected on when the main border portion is projected onto the side of the first region, wherein the first region is a polygonal shape;

determine an identification parameter, which is a third parameter, based on comparing the first parameter and the second parameter; and identify a type of object of the object that is the identification target based on the determined identification parameter.

13. The object identifying apparatus according to claim 12, wherein the identification parameter indicates a relationship between the first parameter and the second parameter, and the ECU is programmed to:
  identify that the type of object of the object is smoke, if the relationship between the first parameter and the second parameter is a first relationship that is set in advance as a relationship observed when the type of object of the object is the smoke, and
  identify that the type of object of the object is an artificial structure, if the relationship between the first parameter and the second parameter is a second relationship that is different from the first relationship, the second relationship being set in advance as a relationship observed when the type of object is an artificial structure.

14. The object identifying apparatus according to claim 12, wherein the identification parameter includes at least one of a ratio of the second parameter to the first parameter or a difference between the first parameter and the second parameter.

15. The object identifying apparatus according to claim 14, wherein the ECU is programmed to:
  identify that the type of object of the object is smoke, if the ratio is smaller than a first threshold value or the difference is larger than a second threshold value, and
  identify that the type of object the object is the artificial structure, if the ratio is larger than a third threshold value that is equal to or larger than the first threshold value or the difference is smaller than a fourth threshold value that is equal to or smaller than the second threshold value.

16. The object identifying apparatus according to claim 12, wherein the ECU is further programmed to, identify the type of object of the object that is the identification target as smoke when a ratio of the second parameter to the first parameter is smaller than a threshold value.

17. The object identifying apparatus according to claim 12, wherein the ECU is further programmed to, identify the type of object of the object that is the identification target as an artificial structure when a ratio of the second parameter to the first parameter is larger than a threshold value.

18. An object identifying apparatus comprising:
  an Electronic Control Unit (ECU) programmed to:
  determine, as a target region in an image, a region in the image having an object that is an identification target, wherein the target region is a polygonal shape;
  classify a plurality of pixels included in a border of the object in the target region based on a direction or direction ranges of image characteristic gradients at each pixel wherein the direction ranges correspond to a plurality of directions;
  calculate a total number of the plurality of pixels included in the border for the direction or the direction ranges of the image characteristic gradients;
  determine a main border portion corresponding to a region at which the plurality of pixels belonging to the direction or the direction ranges of which the total number of the plurality of pixels is at a maximum exists;
  identify a first parameter representing a length along a side of the target region;
  calculate a second parameter representing a sum of lengths of the side of the target region onto which the main border portion is projected on when the main border portion is projected onto the side of the target region; and
  based on the first parameter and the second parameter, identify a type of object of the object that is the identification target.

19. The object identifying apparatus according to claim 18, wherein the sum of lengths includes more than one edge being summed together on one side.

* * * * *